(12) United States Patent
Hagenlocher et al.

(10) Patent No.: US 9,283,937 B2
(45) Date of Patent: Mar. 15, 2016

(54) BRAKE CONTROL UNIT

(71) Applicants: Bosch Corporation, Saitama (JP); Robert Bosch GmbH, Stuttgart (DE)

(72) Inventors: Nils Hagenlocher, Stuttgart (DE); Toshihide Iiba, Kanagawa (JP)

(73) Assignees: Robert Bosch GmbH, Stuttgart (DE); Bosch Corporation, Tokyo (JP)

( * ) Notice: Subject to any disclaimer, the term of this patent is extended or adjusted under 35 U.S.C. 154(b) by 0 days.

(21) Appl. No.: 14/260,424

(22) Filed: Apr. 24, 2014

(65) Prior Publication Data

US 2014/0324311 A1    Oct. 30, 2014

(30) Foreign Application Priority Data

Apr. 24, 2013    (JP) ................. 2013-091409

(51) Int. Cl.
*B60T 8/1755* (2006.01)
(52) U.S. Cl.
CPC .................... *B60T 8/1755* (2013.01)

(58) Field of Classification Search
CPC ... B60T 8/1755; B60T 8/172; B60T 2230/02; B60T 2210/12; B60W 40/068
USPC ............ 701/70, 72, 38, 36, 82; 303/140, 146; 180/197
See application file for complete search history.

(56) References Cited

U.S. PATENT DOCUMENTS

| | | | |
|---|---|---|---|
| 6,101,434 A * | 8/2000 | Irie et al. .................. 701/36 |
| 2004/0080209 A1 | 4/2004 | Leimbach et al. | |
| 2006/0259225 A1 * | 11/2006 | Ono et al. .................. 701/82 |
| 2011/0160962 A1 * | 6/2011 | Crombez .................... 701/41 |
| 2012/0049617 A1 * | 3/2012 | Furuyama ................ 303/9.75 |
| 2012/0265401 A1 * | 10/2012 | Stuetzler et al. ............. 701/38 |

* cited by examiner

*Primary Examiner* — Marthe Marc-Coleman
(74) *Attorney, Agent, or Firm* — Michael Best & Friedrich LLP

(57) ABSTRACT

An ECU which includes a receiving portion that receives a control signal related to braking of a vehicle transmitted from an external ECU installed outside the ECU and a yaw rate estimation portion that estimates a yaw rate of the vehicle, based on a vehicle speed and steering angles which indicate turning angles of a steering wheel of the vehicle or turning angles of a wheel.

5 Claims, 18 Drawing Sheets

FIG. 6

| STRAIGHT DRIVING INDICATOR \ VEHICLE SPEED (km/h) | 0 | 20 | 50 | 100 | 360 |
|---|---|---|---|---|---|
| 0.0 | 2.1 (deg/sec) | 2.1 (deg/sec) | 2.0 (deg/sec) | 1.4 (deg/sec) | 1.4 (deg/sec) |
| 0.3 | 3.2 (deg/sec) | 3.2 (deg/sec) | 2.5 (deg/sec) | 1.5 (deg/sec) | 1.5 (deg/sec) |
| 1.0 | 6.3 (deg/sec) | 6.3 (deg/sec) | 5.0 (deg/sec) | 3.0 (deg/sec) | 3.0 (deg/sec) |

FIG. 7

| High-$\mu$ | |
|---|---|
| STRAIGHT DRIVING INDICATOR | TIME THRESHOLD VALUE (COUNTER UPPER LIMIT) |
| 0.0 | $\alpha$ |
| ↕ | $\alpha + a$ |
| ↕ | $\alpha + b$ |
| 1.0 | $\alpha + c$ |

| Low-$\mu$ | |
|---|---|
| STRAIGHT DRIVING INDICATOR | TIME THRESHOLD VALUE (COUNTER UPPER LIMIT) |
| 0.0 | $\beta$ |
| ↕ | $\beta + d$ |
| ↕ | $\beta + e$ |
| 1.0 | $\beta + f$ |

| | | |
|---|---|---|
| 10 | BEHAVIOR OF VEHICLE IS EXTREMELY DANGEROUS. | DRIVER CANNOT MAINTAIN A STATE WHERE VEHICLE TRAVELS IN TRAVELING LANE AND CANNOT CONTROL BEHAVIOR OF VEHICLE. |
| 7 | MANEUVERABILITY OF VEHICLE CANNOT BE RECOVERED AS LONG AS DRIVER DOES NOT PERFORM SUFFICIENT CORRECTION STEERING OPERATION. IN THIS CASE, BEHAVIOR OF VEHICLE IS EXTREMELY DANGEROUS. | BEHAVIOR OF VEHICLE CANNOT BE CONTROLLED WITH CONSIDERABLE PROBABILITY AND DRIVER FEELS THE SERIOUS DANGER. |
| 8 | | BEHAVIOR OF VEHICLE CANNOT BE CONTROLLED WITH PROBABILITY OF ABOUT 50% AND DRIVER FEELS THE SERIOUS DANGER. |
| 9 | | BEHAVIOR OF VEHICLE CANNOT OFTEN BE CONTROLLED WITH LOW PROBABILITY AND DRIVER FEELS THE SERIOUS DANGER. |
| 6 | MANEUVERABILITY OF VEHICLE CAN BE RECOVERED BY CORRECTION STEERING OPERATED BY DRIVER. IN THIS CASE, BEHAVIOR OF VEHICLE IS AT A LEVEL WITH LITTLE DANGER. | TIME IS REQUIRED FOR RECOVERING CONTROLLABILITY OF VEHICLE AND DRIVER FEELS THE DANGER. |
| 5 | | CONTROLLABILITY OF VEHICLE CAN BE RECOVERED BUT DRIVER FEELS THE DANGER. |
| 4 | | SHORT TIME IS REQUIRED FOR RECOVERING CONTROLLABILITY OF VEHICLE BUT DRIVER FEELS THE DANGER |
| 3 | MANEUVERABILITY OF VEHICLE CAN BE RECOVERED BY SIMPLE CORRECTION STEERING OPERATED BY DRIVER. IN THIS CASE, BEHAVIOR OF VEHICLE IS AT A LEVEL WITH LITTLE DANGER. | TIME IS REQUIRED FOR RECOVERING CONTROLLABILITY OF VEHICLE. DRIVER FEELS A LITTLE DANGER. |
| 2 | | CONTROLLABILITY OF VEHICLE CAN BE RECOVERED. DRIVER FEELS A LITTLE DANGER |
| 1 | | SHORT TIME IS REQUIRED FOR RECOVERING CONTROLLABILITY OF VEHICLE. DRIVER FEELS A LITTLE DANGER |
| 0 | BEHAVIOR OF VEHICLE IS NOT DANGEROUS AT ALL. | VEHICLE TRAVELING DIRECTION IS HARDLY CHANGED AND DRIVER DOES NOT FEEL DANGER. |

BRAKE CONTROL UNIT

BACKGROUND OF THE INVENTION

The present invention relates to a brake control unit.

A brake control unit is installed in a vehicle of the related art, such as an automobile and the brake control unit performs various brake controls.

For example, when wheels are likely to be locked, the brake control unit detects this situation and performs an Antilock Brake System (ABS) control in which the wheels are prevented from being locked by loosening brakes. Furthermore, the brake control unit performs, in addition to the ABS control, a control in which, when a braking operation of the vehicle is performed, a motion of the vehicle is stabilized by the optimal distribution of a braking force to the wheels, and the like.

A brake control in which a motion of a vehicle is stabilized using data on a vehicle speed, a yaw rate detected by a yaw rate sensor, steering angles, and the like has been disclosed in, for example, JP-T-2004-516194.

However, in recent years, it has been required that, in addition to the brake control by the brake control unit, a brake control which is performed based on a brake control signal transmitted from another control unit (an external control unit) installed in a vehicle be applied.

That is, in some cases, the vehicle is equipped with not only the brake control unit but also the external control unit (a control unit of a third party) and a brake control signal which is based on control logic saved in the external control unit is output from the external control unit to the brake control unit. In this case, it is conceivable that the brake control unit receives the intervention of the brake control signal from the external control unit and performs a brake control of the vehicle based on the received brake control signal.

However, in some cases, the brake control of a vehicle, which is performed based on the brake control signal transmitted from the external control unit, results in the behavior of the vehicle becoming unstable. Thus, it is conceivable that, in some cases, the brake control which is performed with the intervention of the brake control signal output from the external control unit is improper.

SUMMARY OF THE INVENTION

An object of the invention is to realize a brake control unit which can appropriately control degrees of intervention of a brake control signal output from an external control unit in a brake control.

The invention is made under consideration of the object described above. According to an aspect of the invention, there is provided a brake control unit for controlling braking of a vehicle, that includes a receiving portion that receives a control signal related to braking of the vehicle which is transmitted from an external control unit installed outside the brake control unit, an estimation portion that estimates a yaw rate of the vehicle, based on a vehicle speed and steering angles which indicate turning angles of a steering wheel of the vehicle or turning angles of a wheel, and a controller which controls degrees of intervention of the control signal received by the receiving portion in a brake control, based on a deviation between the yaw rate estimated by the estimation portion and an actual yaw rate measured by a yaw rate sensor.

In the aspect, the controller may determine whether or not to activate a brake control by the control signal, based on the deviation.

In the aspect, the controller may deactivate the brake control by the control signal when the deviation exceeds a predetermined deviation threshold value.

In the aspect, the controller may set the deviation threshold value to be smaller in accordance with an increase in the vehicle speed.

In the aspect, in a state where the deviation exceeds the deviation threshold value, when a duration in which the deviation continuously exceeds the deviation threshold value exceeds a predetermined time threshold value, the controller may deactivate the brake control by the control signal.

In the aspect, the brake control unit may further include a straight driving indicator determination portion that calculates a straight driving indicator of the vehicle, based on the steering angles of the vehicle and a steering angular speed which indicates a turning speed of the steering wheel of the vehicle or a turning speed of the wheel, in which the controller may set the deviation threshold value or the time threshold value to be smaller in accordance with an increase in the straight driving indicator which is calculated by the straight driving indicator determination portion.

According to the invention, it is possible to realize the brake control unit which can appropriately control degrees of intervention of the brake control signal output from the external control unit in the brake control.

BRIEF DESCRIPTION OF THE DRAWINGS

FIG. 6 is a table illustrating an example of a deviation threshold value which is set in accordance with a straight driving indicator and a vehicle speed.

FIG. 7 is a table illustrating an example of a counter upper limit which is set in accordance with the straight driving indicator, in a case where a road has a high-$\mu$ value.

FIG. 8 is a table illustrating an example of a counter upper limit which is set in accordance with the straight driving indicator, in a case where a road has a low-$\mu$ value.

FIG. 10 is a table illustrating an example of settings of sensory evaluation results.

DETAILED DESCRIPTION

Hereinafter, an embodiment of the invention will be described with reference to the accompanying drawings.

First, a concept of a vehicular brake hydraulic circuit equipped with a brake control unit of the invention will be described with reference to FIG. 1.

Figure 1:
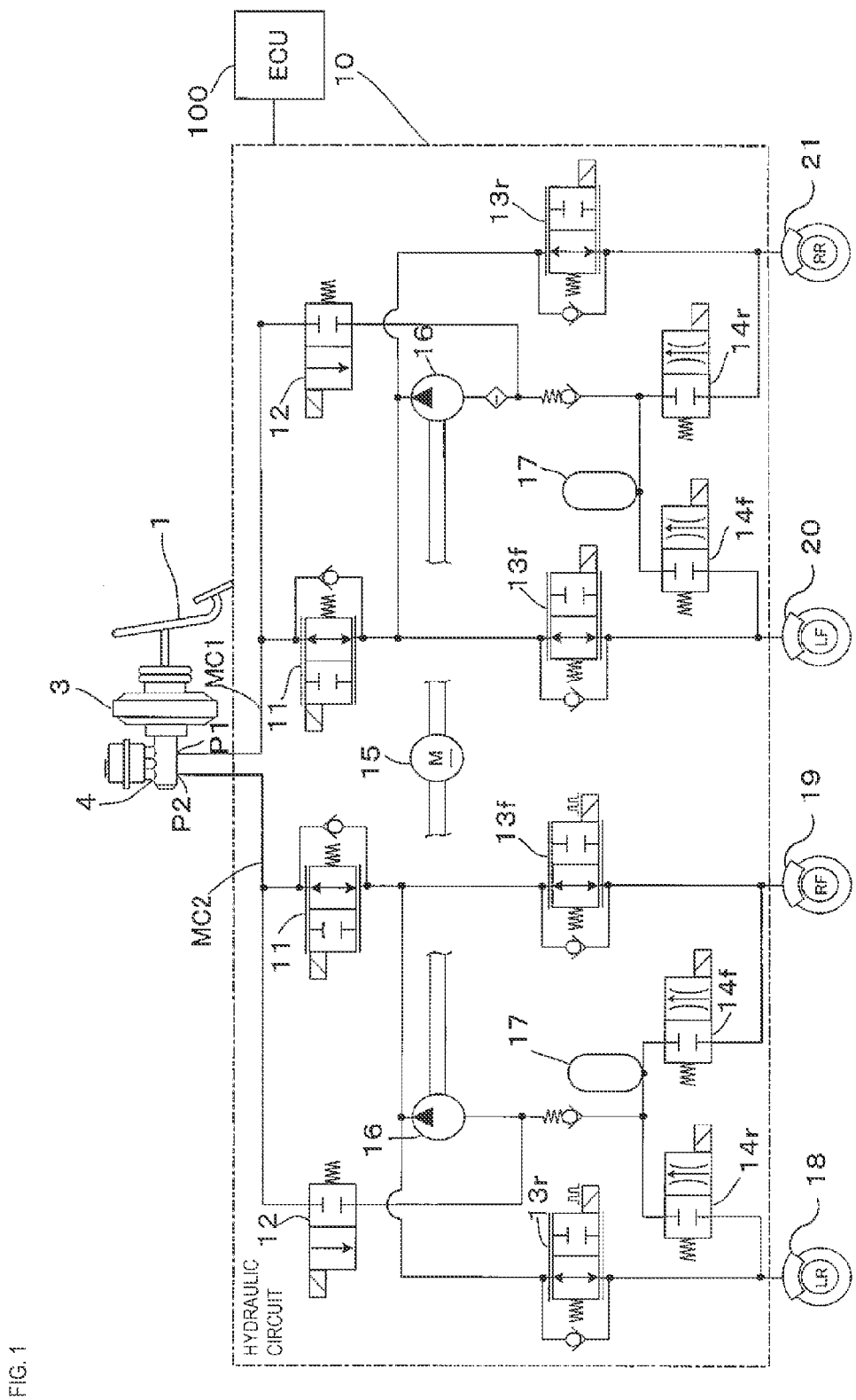
FIG. 1 is a diagram illustrating a vehicular brake hydraulic circuit of an embodiment.

The brake hydraulic circuit of the embodiment is a so-called X type piping circuit hydraulic circuit in which dual brake lines are provided and each line causes one front wheel and one rear wheel located in a position diagonal to the front wheel to be braked as one set, as illustrated in FIG. 1. However, the brake hydraulic circuit of the invention is not limited thereto. Furthermore, a four-wheel vehicle is exemplified in a description of the embodiment. However, the invention is not limited to a four-wheeled vehicle but can be widely applied to a vehicle including a two-wheeled vehicle.

In a hydraulic circuit 10 illustrated in FIG. 1, a tread force which is applied to a brake pedal 1 is boosted through a booster 3, and then the boosted tread force is transmitted to a master cylinder 4 as a hydraulic pressure generation source. Two compression chambers which are formed by a primary piston and a secondary piston (not illustrated) are provided in the master cylinder 4. When each piston is pressed in accordance with a brake pedal operation, a brake fluid moves to the hydraulic circuit 10 through hydraulic pressure ports P1 and P2 which respectively communicate with compression chambers.

The booster 3 is, for example, a pneumatic booster. The booster 3 is connected to the brake pedal 1 side through an input rod (not illustrated), and the boosted tread force is transmitted to the master cylinder 4 through a push rod (not illustrated) which is connected to the primary piston. Furthermore, as similar to a booster of the related art, the booster 3 has a so-called jumping-in characteristic. Therefore, a predetermined gap (in other words, a jumping-in range) is provided between the input rod and a reaction disc mounted to the push rod such that a range within which the reaction force is very small is provided between a position in which the input rod of the booster 3 is not connected to the push rod of the master cylinder 4 and a position in which the input rod is mechanically connected to the push rod.

Brake conduits MC1 and MC2 respectively extend from the hydraulic pressure ports P1 and P2 of the master cylinder 4 to wheel cylinders of respective wheels (RF, LR, LF, and RR wheels). The hydraulic circuit in a brake device of the embodiment is an X type dual piping hydraulic circuit, as described above. In an example illustrated in FIG. 1, the hydraulic circuit 10 is configured so that the brake fluid is supplied, through the brake conduit MC2, to the wheel cylinder of a right front (RF) wheel hydraulic pressure brake 19 and the wheel cylinder of a left rear (LR) wheel hydraulic pressure brake 18. In contrast, the hydraulic circuit 10 is configured so that the brake fluid is supplied, through the brake conduit MC1, to the wheel cylinder of a left front (LF) wheel hydraulic pressure brake 20 and the wheel cylinder of a right rear (RR) wheel hydraulic pressure brake 21. As described above, each brake 18, 19, 20, or 21 is configured so that a braking force can be applied to the wheel by operating the wheel cylinder using a hydraulic pressure.

The hydraulic circuit of each line includes, as an electromagnetic valve, a circuit control valve 11 which is a normally open type valve and linearly controllable, a suction valve 12 which is a normally closed type valve and is On/Off controllable, pressure booster valves 13$f$ and 13$r$ which are normally open type valves and are linearly controllable, and pressure reducing valves 14$f$ and 14$r$ which are normally closed type valves and are On/Off controllable. The hydraulic circuit of each line further includes a pump 16 which is driven by a pump motor 15 and a low pressure accumulator 17.

A configuration of the hydraulic circuit of the brake conduit MC1 line is the same as that of the hydraulic circuit of the brake conduit MC2. Thus, only the hydraulic circuit of the brake conduit MC2 will be described as a representative example.

The circuit control valve 11 is disposed to allow the master cylinder 4 to communicate with or be blocked from the pressure booster valves 13*f* and 13*r*.

The suction valve 12 is disposed to allow the master cylinder 4 to communicate with or be blocked from a suction side of the pump 16. The pressure booster valve 13*f* and the pressure reducing valve 14*f* are provided adjacent to the right front wheel hydraulic pressure brake 19. The pressure booster valve 13*f* and the pressure reducing valve 14*f* are used for ABS control of the right front wheel hydraulic pressure brake 19. The pressure booster valve 13*r* and the pressure reducing valve 14*r* are provided adjacent to the left rear hydraulic pressure brake 18. The pressure booster valve 13*r* and the pressure reducing valve 14*r* are used for ABS control of the left rear wheel hydraulic pressure brake 18.

The pressure booster valve 13*f* is provided between the circuit control valve 11 and the right front wheel hydraulic pressure brake 19. The pressure booster valve 13*f* is linearly controllable and can continuously regulate a flow rate of the brake fluid flowing from the master cylinder 4 side or the circuit control valve 11 side to the wheel cylinder side of the right front wheel hydraulic pressure brake 19. The pressure booster valve 13*f* has a bypass flow passage including a check valve. When the pressure booster valve 13*f* is in a closed state, the check valve allows the brake fluid to flow from the right front wheel hydraulic pressure brake 19 side to the master cylinder 4 side or the circuit control valve 11 side and prevents the brake fluid from flowing in the opposite direction.

The pressure reducing valve 14*f* is a solenoid valve which only allows a fully opened state and a fully closed state. The pressure reducing valve 14*f* is provided between the wheel cylinder of the right front wheel hydraulic pressure brake 19 and the accumulator 17. When the pressure reducing valve 14*f* is opened, the pressure reducing valve 14*f* can cause a pressure of the brake fluid, which is supplied to the wheel cylinder of the right front wheel hydraulic pressure brake 19, to be reduced. The pressure reducing valve 14*f* can regulate the flow rate of the brake fluid flowing from the wheel cylinder of the right front wheel hydraulic pressure brake 19 to the accumulator 17 in such a manner that the pressure reducing valve 14*f* is repeatedly opened and closed.

The pressure booster valve 13*r* is provided between a conduit which connects the circuit control valve 11 and the pressure booster valve 13*f* and the wheel cylinder of the left rear wheel hydraulic pressure brake 18. The pressure booster valve 13*r* is linearly controllable and can continuously regulate the flow rate of the brake fluid flowing from the master cylinder 4 side, the circuit control valve 11 side, the pressure booster valve 13*f* side, or the wheel cylinder side of the right front wheel hydraulic pressure brake 19 to the wheel cylinder side of the left rear wheel hydraulic pressure brake 18. The pressure booster valve 13*r* has a bypass flow passage including a check valve. When the pressure booster valve 13*r* is in a closed state, the check valve allows the brake fluid to flow from the left rear hydraulic pressure brake 18 side to the right front wheel hydraulic pressure brake 19 side and prevents the brake fluid from flowing in an opposite direction.

The pressure reducing valve 14*r* on the left rear wheel side is a solenoid valve which only allows a fully opened state and a fully closed state. The pressure reducing valve 14*r* is provided between the wheel cylinder of the left rear wheel hydraulic pressure brake 18 and the accumulator 17. When the pressure reducing valve 14*r* is opened, the pressure reducing valve 14*r* can cause a pressure of the brake fluid, which is supplied to the wheel cylinder of the left rear hydraulic pressure brake 18, to be reduced by supplying the brake fluid to the accumulator 17. The pressure reducing valve 14*r* can regulate the flow rate of the brake fluid flowing from the wheel cylinder of the left rear wheel hydraulic pressure brake 18 to the accumulator 17 in such a manner that the pressure reducing valve 14*r* is repeatedly opened and closed.

Figure 2:
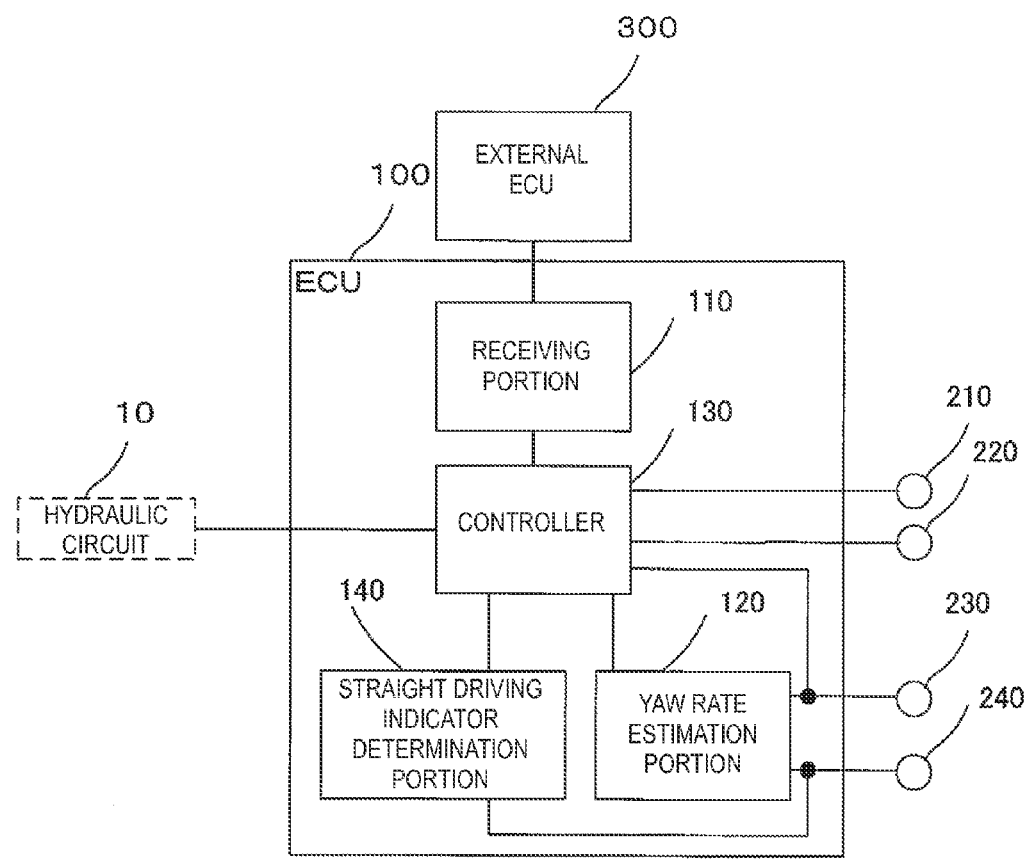
FIG. 2 is a block diagram of an ECU of the embodiment.

Hereinafter, an embodiment of the brake control unit of the invention will be described. FIG. 2 is a block diagram of an ECU of the embodiment. An ECU (Engine Control Unit: brake control unit) 100 of the embodiment is connected to the hydraulic circuit 10 and an external ECU (a third party) 300, as illustrated in FIG. 2. In addition, a yaw rate sensor 210 which detects a vehicle yaw rate, an acceleration sensor 220 which detects a vehicle acceleration, a speed sensor 230 which detects a vehicle speed, and a steering angle sensor 240 which detects turning angles of a steering wheel of a vehicle or turning angles of the wheel are connected to the ECU 100. Values detected by each sensor are input to the ECU 100.

The ECU 100 includes a receiving portion 110, a yaw rate estimation portion 120, a controller 130, and a straight driving indicator determination portion 140.

The receiving portion 110 receives a control signal related to braking of a vehicle, which is transmitted from the external ECU 300 provided outside the ECU 100.

The yaw rate estimation portion 120 estimates the vehicle yaw rate, based on a vehicle speed detected by the speed sensor 230 and a steering angle detected by the steering angle sensor 240. The yaw rate estimation portion 120 calculates the Ackermann yaw rate (Ackermann_Yaw_Rate) using Math. 1 described below. The calculated Ackermann yaw rate is used as a normative yaw rate of the vehicle.

$$\text{Ackermann\_Yaw\_Rate} = \frac{1}{1+\left(\frac{Vx}{Vch}\right)^2} \times \frac{Vx}{Ix} \times \tan(SWA) \quad \text{[Math. 1]}$$

Vx is a vehicle speed, and Vch is a vehicle stability characteristic velocity. Furthermore, Ix is a wheel base between the front wheel and the rear wheel of a vehicle, and SWA is turning angles of a steering wheel of a vehicle.

The controller 130 calculates a deviation (a yaw rate deviation) between a yaw rate estimated by the yaw rate estimation portion 120 and an actual yaw rate measured by the yaw rate sensor 210. Then, the controller 130 controls degrees of intervention of the control signal (a request signal) received by the receiving portion 110 in a brake control, based on the calculated yaw rate deviation.

Specifically, the controller 130 determines whether or not to activate the brake control by the received control signal (the request signal), based on the calculated deviation.

For example, when the calculated deviation exceeds a predetermined deviation threshold value, the controller 130 deactivates the brake control by the received control signal (the request signal). The operation described above will be described with reference to FIG. 3.

Figure 3:
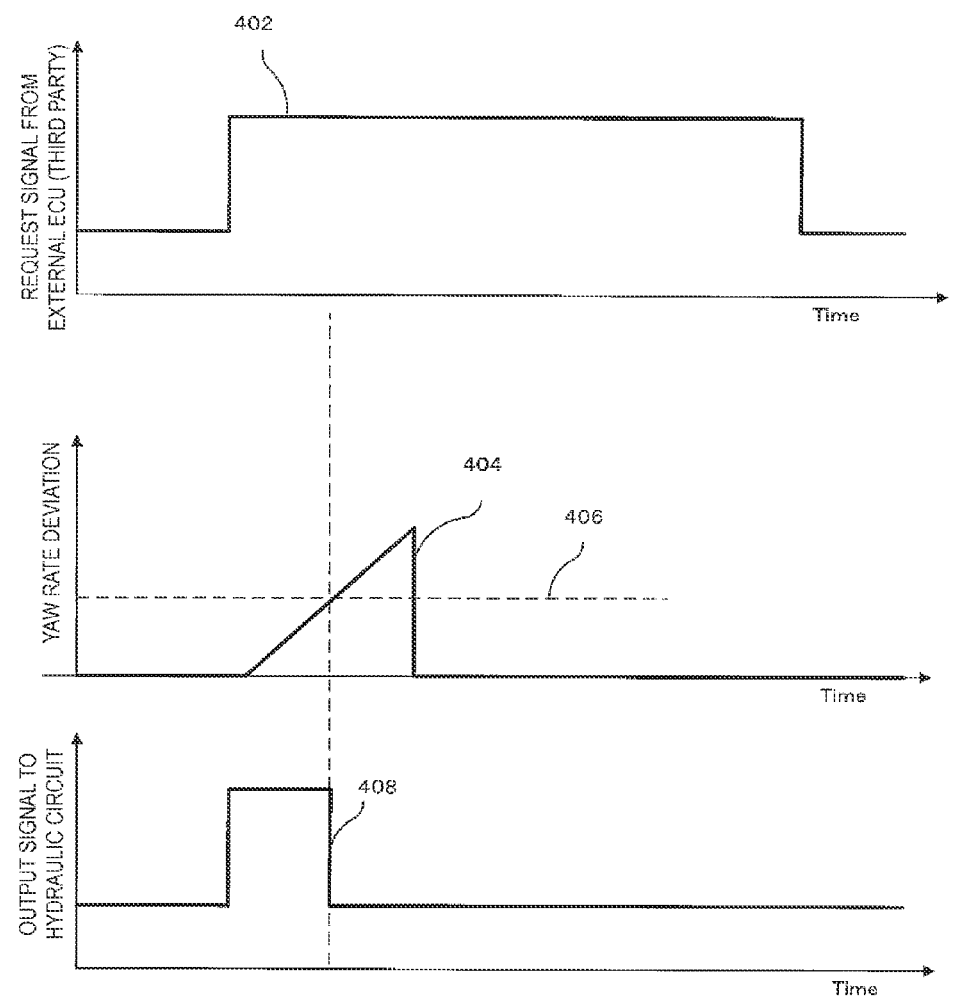
FIG. 3 is a diagram illustrating an example of an intervention degree control of a brake control signal output from an external ECU in a brake control, which is performed by the ECU of the embodiment.

FIG. 3 is a diagram illustrating an example of an intervention degree control of a brake control signal output from an external ECU in a brake control, which is performed by the ECU of the embodiment. In FIG. 3, a horizontal axis indicates an elapsed time and vertical axes indicate a request signal 402 from the external ECU (the third party), a yaw rate deviation 404, and an output signal 408 sent to the hydraulic circuit, in order from the top.

When the receiving portion 110 receives, from the external ECU 300, the request signal 402 related to braking, the controller 130 calculates the deviation (the yaw rate deviation 404) between the yaw rate estimated by the yaw rate estimation portion 120 and the actual yaw rate measured by the yaw rate sensor 210. Then, the controller 130 compares the calculated deviation (the yaw rate deviation 404) and a deviation threshold value 406. In this case, for example, when the controller 130 receives the request signal 402 and the yaw rate deviation 404 is smaller than the deviation threshold value 406, the controller 130 outputs the request signal 402, as it is, received from the external ECU 300 to the hydraulic circuit 10, as the output signal 408 sent to the hydraulic circuit.

The following situation is assumed as an example. The request signal 402 from the external ECU 300 is output to the hydraulic circuit 10, as it is, and thus behavior of a vehicle becomes unstable. As a result, the yaw rate deviation 404 gradually increases. In this case, the controller 130 compares the yaw rate deviation 404 and the deviation threshold value 406. When the yaw rate deviation 404 is greater than the deviation threshold value 406, the controller 130 stops the request signal 402, which is received from the external ECU 300, from being output to the hydraulic circuit 10, as illustrated by the output signal 408. Therefore, the controller 130 can deactivate the brake control by the received control signal.

According to the embodiment, in a case where the behavior of a vehicle becomes unstable due to the request signal 402 which is output from the external ECU 300 to the hydraulic circuit 10, as it is, the controller 130 can deactivate an intervention of the request signal 402 in the brake control. In other words, the deviation (the yaw rate deviation) between the yaw rate estimated by the yaw rate estimation portion 120 and the actual yaw rate measured by the yaw rate sensor 210 indicates degrees of instability of the behavior of a vehicle. Thus, when the yaw rate deviation 404 is greater than the deviation threshold value 406, the controller 130 can deactivate the intervention of the request signal 402 in the brake control. As a result, in the embodiment, the degrees of intervention of the brake control signal output from the external ECU in the brake control can be appropriately controlled.

Figure 4:
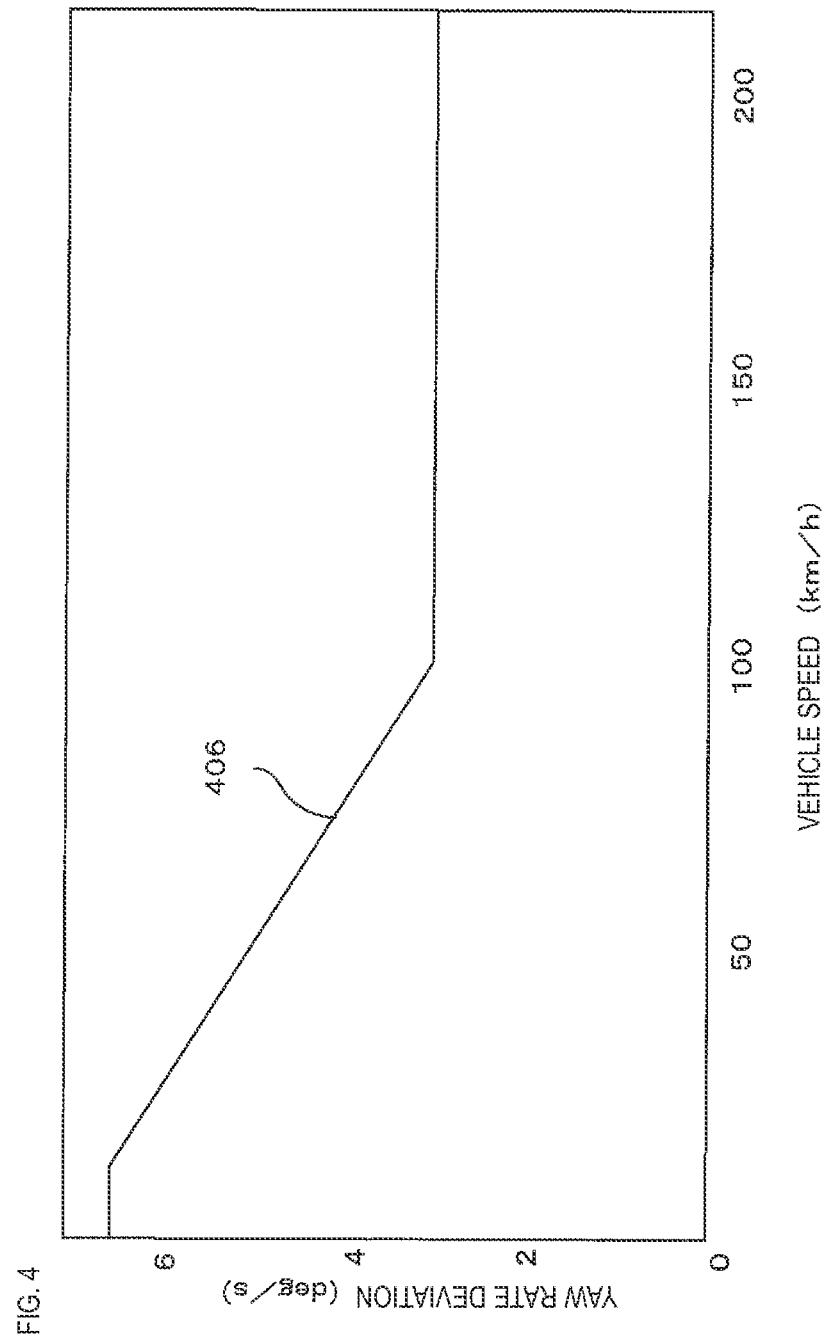
FIG. 4 is a diagram illustrating a setting example of a deviation threshold value.

In the above description, a case in which the deviation threshold value 406 is set to be constant is exemplified. However, the invention is not limited thereto. FIG. 4 is a diagram illustrating a setting example of a deviation threshold value.

The controller 130 can set the deviation threshold value 406 to be smaller in accordance with an increase in the vehicle speed detected by the speed sensor 230, as illustrated in FIG. 4. In other words, the faster the vehicle speed is, the more difficult it is for the behavior of a vehicle to return from an unstable state to a stable state. In this case, it is possible to promptly deactivate the intervention of the request signal 402, which is output from the external ECU 300, in the brake control, in such a manner that the controller 130 sets the deviation threshold value 406 to be smaller in accordance with an increase in a vehicle speed.

Figure 5:
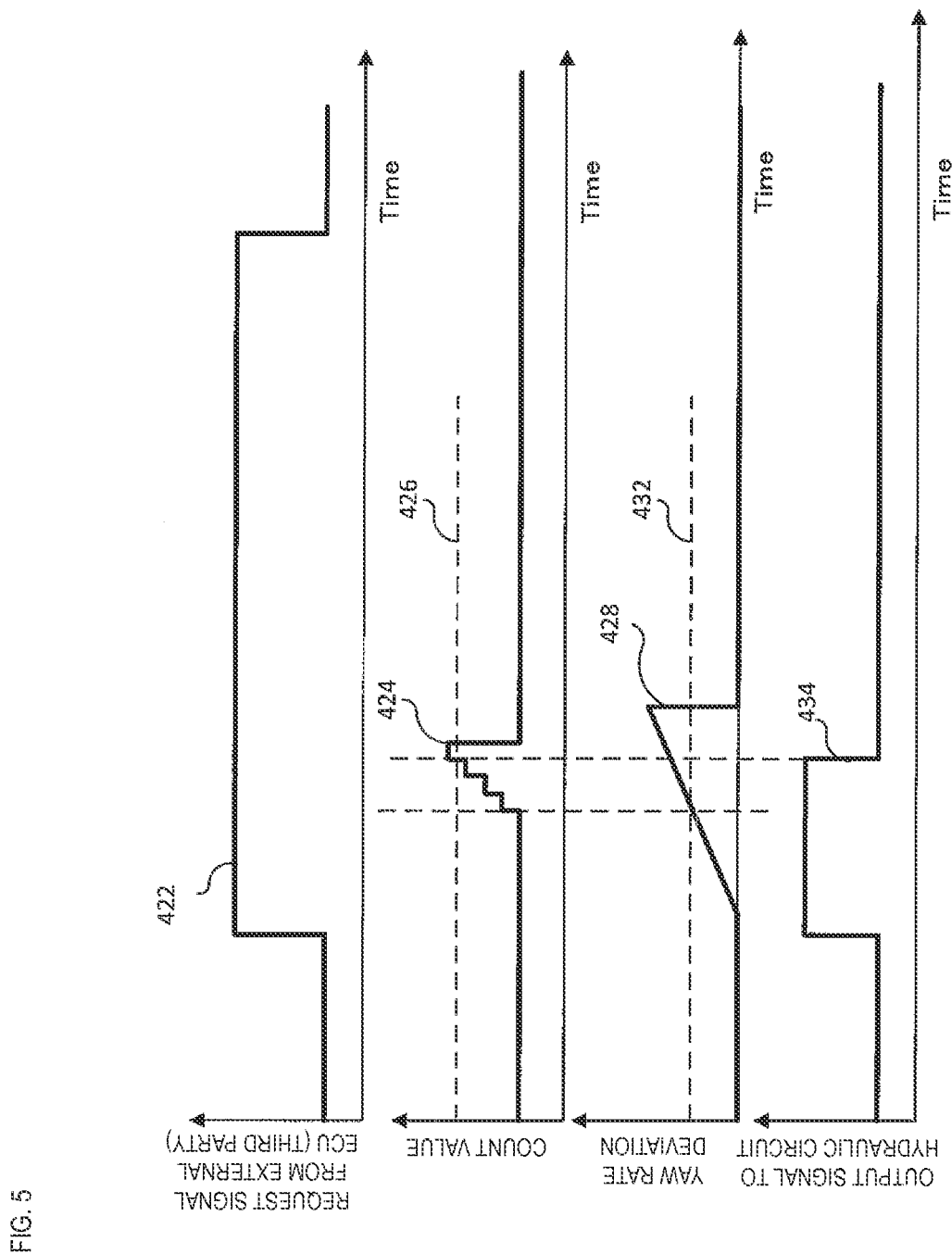
FIG. 5 is a diagram illustrating an example of the intervention degree control of the brake control signal output from the external ECU in the brake control, which is performed by the ECU of the embodiment.

In the above description, a case in which, when the yaw rate deviation 404 is greater than the deviation threshold value 406, the controller 130 deactivates the intervention of the request signal 402 in the brake control is exemplified. However, the invention is not limited thereto. FIG. 5 is a diagram illustrating an example of the intervention degree control of the brake control signal output from the external ECU in the brake control, which is performed by the ECU of the embodiment.

In FIG. 5, a horizontal axis indicates an elapsed time and vertical axes indicate a request signal 422 from the external ECU (the third party), a count value 424, a yaw rate deviation 428, and an output signal 434 sent to the hydraulic circuit, in order from the top.

When the receiving portion 110 receives, from the external ECU 300, the request signal 422 related to braking, the controller 130 calculates the deviation (the yaw rate deviation 404) between the yaw rate estimated by the yaw rate estimation portion 120 and the actual yaw rate measured by the yaw rate sensor 210. Then, the controller 130 compares the calculated deviation (the yaw rate deviation 428) and a deviation threshold value 432. In addition, when the yaw rate deviation 428 exceeds the deviation threshold value 432, the controller 130 counts duration (the count value 424) in which the yaw rate deviation 428 continuously exceeds the deviation threshold value 432. Then the controller 130 compares the count value 424 and a predetermined time threshold value 426. In this case, when the controller 130 receives the request signal 422 and the count value 424 is smaller than the time threshold value 426, the controller 130 outputs the request signal 422, as it is, received from the external ECU 300 to the hydraulic circuit 10, as the output signal 434 sent to the hydraulic circuit.

The following situation is assumed as an example. The request signal 422 from the external ECU 300 is output to the hydraulic circuit 10, as it is, and thus the behavior of a vehicle becomes unstable. As a result, the yaw rate deviation 428 gradually increases. In this case, the controller 130 compares the yaw rate deviation 428 and the deviation threshold value 432. When the yaw rate deviation 428 is greater than the deviation threshold value 432, the controller 130 starts to increment the count value 424. The count value 424 is incremented while the yaw rate deviation 428 is greater than the deviation threshold value 432. The controller 130 compares the count value 424 and the time threshold value 426. Then, when the count value 424 is greater than the time threshold value 426, the controller 130 stops the request signal 422, which is received from the external ECU 300, from being output to the hydraulic circuit 10, as illustrated by the output signal 434. Therefore, the controller 130 can deactivate the brake control by the received control signal.

According to the embodiment, in a case where the behavior of a vehicle becomes significantly unstable due to the request signal 422 which is received from the external ECU 300 and output to the hydraulic circuit 10, as it is, the controller 130 can deactivate the intervention of the request signal 422 in the brake control. In other words, in a state where the yaw rate deviation 428 exceeds the deviation threshold value 432, when duration (the count value 424) in which the yaw rate deviation 428 continuously exceeds the deviation threshold value 432 exceeds the predetermined time threshold value 426, the controller 130 deactivates the brake control by the control signal. Therefore, in a state where the behavior of a vehicle is not unstable, even when the yaw rate deviation 428 temporarily increases for some reason, regardless of the behavior of a vehicle, the controller 130 does not deactivate the intervention of the request signal 422 in the brake control. Only when the count value 424 exceeds the time threshold value 426 and the behavior of a vehicle becomes significantly unstable, the controller 130 can deactivate the intervention of the request signal 422 in the brake control. As a result, in the embodiment, the degrees of intervention of the brake control signal output from the external ECU in the brake control can be appropriately controlled.

In the above description, a case in which the deviation threshold value 432 is set to be constant is exemplified. However, the invention is not limited thereto. FIG. 6 is a table illustrating an example of a deviation threshold value which is set in accordance with a straight driving indicator and a vehicle speed.

The straight driving indicator determination portion 140 calculates the straight driving indicator of a vehicle, based on the steering angles detected by a steering angle sensor 240 and a steering angular speed which indicates a turning speed of a steering wheel of a vehicle or a turning speed of the wheel. In addition, the straight driving indicator determination portion 140 calculates the steering angular speed by time-differentiating the steering angles detected by the steering angle sensor 240.

The straight driving indicator can be linearly selected from values in a range, for example, between 0.0 to 1.0. For example, when a vehicle travels straight ahead, the straight driving indicator indicates 0.0. When a vehicle turns slowly, the straight driving indicator is set to 0.3, and when a vehicle turns sharply, the straight driving indicator is set to 1.0.

The controller 130 can set the deviation threshold value to be smaller in accordance with an increase in the straight driving indicator calculated by the straight driving indicator determination portion 140, as illustrated in FIG. 6. In addition, a smaller straight driving indicator value means that the straight driving indicator is increased.

For example, in a case where a vehicle speed is set to 20 Km/h, when the straight driving indicator is set to 1.0, the controller 130 sets the deviation threshold value to 6.3 (deg/sec). Furthermore, when the straight driving indicator is set to 0.3, the controller 130 sets the deviation threshold value to 3.2 (deg/sec), and when the straight driving indicator is set to 0.0, the controller 130 sets the deviation threshold value to 2.1 (deg/sec). As similar to the configuration described above, the controller 130 sets the deviation threshold value to be smaller in accordance with an increase in the vehicle speed.

In a state (a state where the straight driving indicator is set to approximately 1.0) where a vehicle turns sharply, it is difficult for the behavior of a vehicle to become unstable even when an inappropriate brake control signal is input from the external ECU 300. On the contrary, in a state (a state where the straight driving indicator is set to approximately 0.0) where a vehicle travels in a substantially straight direction, when an inappropriate brake control signal is input from the external ECU 300 and a braking operation is performed based on the brake control signal, the behavior of the vehicle is likely to be unstable. However, in terms of this point of view, the controller 130 of the embodiment sets the deviation threshold value to be smaller in accordance with an increase in the straight driving indicator calculated by the straight driving indicator determination portion 140. Thus, in a state where a vehicle travels in a substantially straight direction, when the behavior of a vehicle becomes unstable due to the brake control signal input from the external ECU 300, it is possible to promptly deactivate the brake control signal.

In the above description, a case in which the time threshold value 426 is set to be constant is exemplified. However, the invention is not limited thereto. FIG. 7 is a table illustrating an example of a counter upper limit which is set in accordance with the straight driving indicator, in a case where a road has a high-μ value. FIG. 8 is a table illustrating an example of a counter upper limit which is set in accordance with the straight driving indicator, in a case where a road has a low-μ value. FIG. 7 illustrates a setting example of the counter upper limit in a case where a road is a road having a high-μ value, such as an asphalt road. FIG. 8 illustrates a setting example of the counter upper limit in a case where a road is a road having a low-μ value, such as a snowy road.

The controller 130 can set the time threshold value (the counter upper limit) to be smaller in accordance with an increase in the straight driving indicator which is calculated by the straight driving indicator determination portion 140, as illustrated in FIGS. 7 and 8. In addition, a smaller straight driving indicator value means that the straight driving indicator is increased.

In an example illustrated in FIG. 7, when the straight driving indicator is set to 0.0, the controller 130 can set the time threshold value 426 (the counter upper limit) to α. In addition, the controller 130 can set the time threshold value 426 (the counter upper limit) to α+a, α+b, and α+c (in this case, a<b<c) in a sequential manner, as the straight driving indicator increases up to 1.0.

In an example illustrated in FIG. 8, when the straight driving indicator is set to 0.0, the controller 130 can set the time threshold value 426 (the counter upper limit) to β. In addition, the controller 130 can set the time threshold value 426 (the counter upper limit) to β+d, β+e, and β+f (in this case, d<e<f) in a sequential manner, as the straight driving indicator increases up to 1.0.

In a state (a state where the straight driving indicator is set to approximately 1.0) where a vehicle turns sharply, it is difficult for the behavior of a vehicle to become unstable even when an inappropriate brake control signal is input from the external ECU 300. On the contrary, in a state (a state where the straight driving indicator is set to approximately 0.0) where a vehicle travels in a substantially straight direction, when an inappropriate brake control signal is input from the external ECU 300 and a braking operation is performed based on the brake control signal, the behavior of the vehicle is likely to be unstable. However, in terms of this point of view, the controller 130 of the embodiment sets the time threshold value to be smaller in accordance with an increase in the straight driving indicator calculated by the straight driving indicator determination portion 140. Thus, in a state where a vehicle travels in a substantially straight direction, when the behavior of a vehicle becomes unstable due to the brake control signal input from the external ECU 300, it is possible to promptly deactivate the brake control signal.

Figure 9:
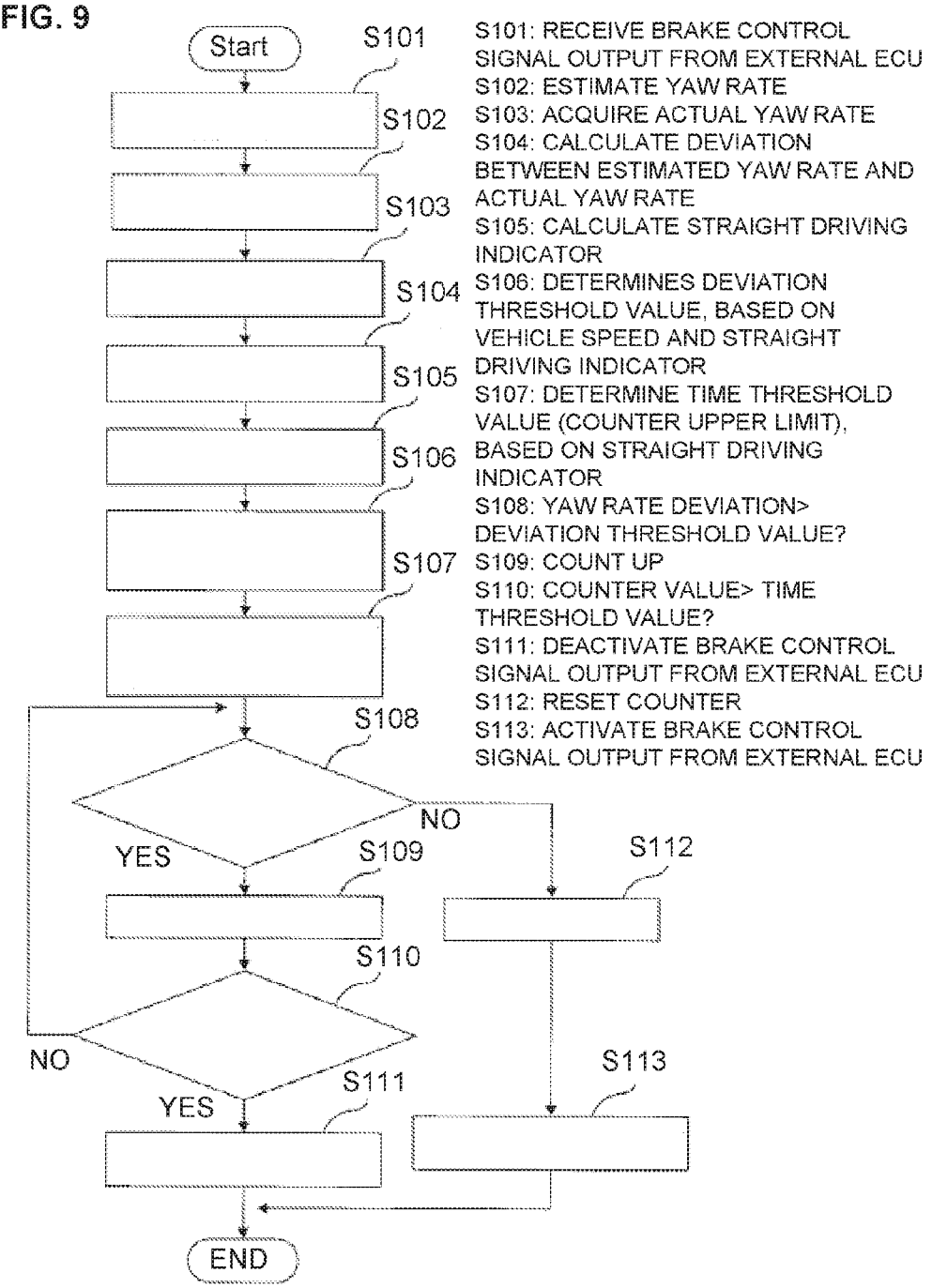
FIG. 9 is a flow chart illustrating a process flow by the ECU of the embodiment.

Next, a process flow by the ECU 100 of the embodiment will be described. FIG. 9 is a flow chart illustrating a process flow by the ECU of the embodiment. First, the receiving portion 110 receives the brake control signal which is output from the external ECU 300 (Step S101), as illustrated in FIG. 9.

Subsequently, the yaw rate estimation portion 120 estimates the vehicle yaw rate, based on the vehicle speed detected by the speed sensor 230 and the steering angles detected by the steering angle sensor 240 (Step S102).

Next, the controller 130 acquires the actual yaw rate detected by the yaw rate sensor 210 (Step S103). Then, the controller 130 calculates a deviation (the yaw rate deviation) between an estimated yaw rate, which is estimated in Step S102, and the actual yaw rate, which is acquired in Step S103 (Step S104).

Next, the straight driving indicator determination portion 140 calculates the straight driving indicator of a vehicle, based on the steering angles detected by the steering angle sensor 240 and the steering angular speed which indicates a turning speed of a steering wheel of a vehicle or a turning speed of the wheel (Step S105).

Subsequently, the controller 130 determines the deviation threshold value, based on the vehicle speed detected by the speed sensor 230 and the straight driving indicator which is calculated in Step S105 (Step S106).

Next, the controller 130 determines the time threshold value (the counter upper limit), based on the straight driving indicator (Step S107).

Then, the controller 130 compares the yaw rate deviation calculated in Step S104 and the deviation threshold value determined in Step S106 and determines whether or not the yaw rate deviation is greater than the deviation threshold value (Step S108).

When it is determined that the yaw rate deviation is greater than the deviation threshold value (Step S108, Yes), the controller 130 increments the value of the counter (Step S109).

Next, the controller 130 compares the count value which is incremented in Step S109 and the time threshold value (the counter upper limit) which is determined in Step S107 and determines whether or not the count value is greater than the time threshold value (Step S110).

When it is determined that the count value is greater than the time threshold value (Step S110, Yes), the controller 130 deactivates the brake control signal which is output from the external ECU 300 (Step S111). In other words, the controller 130 stops the brake control signal, which is output from the external ECU 300, from being output to the hydraulic circuit 10.

On the contrary, when it is determined that the count value is not greater than the time threshold value (Step S110, No), the controller 130 returns to Step S108 and continues the processes.

When, in Step S108, it is determined that the yaw rate deviation is not greater than the deviation threshold value (Step S108, No), the controller 130 resets the count value of the counter (Step S112). Next, the controller 130 activates the brake control signal which is output from the external ECU 300 (Step S113). In other words, the controller 130 outputs the brake control signal, which is output from the external ECU 300, to the hydraulic circuit 10, as it is.

A case in which it is determined whether or not to allow the brake control signal output from the external ECU 300 to be output to the hydraulic circuit 10, as it is, and the selection is made, is exemplified in the embodiment. However, the configuration is not limited thereto. For example, in a case where the count value is not used, the controller 130 can output, to the hydraulic circuit 10, the brake control signal output from the external ECU 300 in a state where the degrees of intervention of the brake control signal is lowered, as the yaw rate deviation increases. In addition, In a case where the count value is used, the controller 130 can output, to the hydraulic circuit 10, the brake control signal output from the external ECU 300 in a state where the degrees of intervention of the brake control signal is lowered, as the count value increases.

Next, experimental results which are obtained using the ECU 100 of the embodiment will be described. Settings of sensory evaluation results will be described before describing the experimental results. FIG. 10 is a table illustrating an example of settings of the sensory evaluation results.

As illustrated in FIG. 10, the sensory evaluation results show how dangerous the behavior of a vehicle is, how the driver of a vehicle feels, and the like, in which the results are divided into "0" to "10" ranks.

For example, the sensory evaluation result of "0" means that the behavior of a vehicle is not dangerous at all and a driver does not feel the danger because a vehicle traveling direction is hardly changed. An increase in the sensory evaluation result means that the behavior of a vehicle becomes dangerous and a driver of a vehicle feels the danger.

For example, the sensory evaluation result of "5" means that the maneuverability of a vehicle can be recovered by correction steering operated by a driver. In this case, the behavior of a vehicle is at a level with little danger. In addition, although the controllability of a vehicle can be recovered, a driver feels the danger.

For example, the sensory evaluation result of "10" means that the behavior of a vehicle is extremely dangerous and a driver cannot maintain a state where a vehicle travels in a traveling lane and cannot control the behavior of a vehicle.

The experimental results which are obtained in experiments using the ECU 100 of the embodiment will be described based on the ranks of the sensory evaluation results.

Figure 11A:
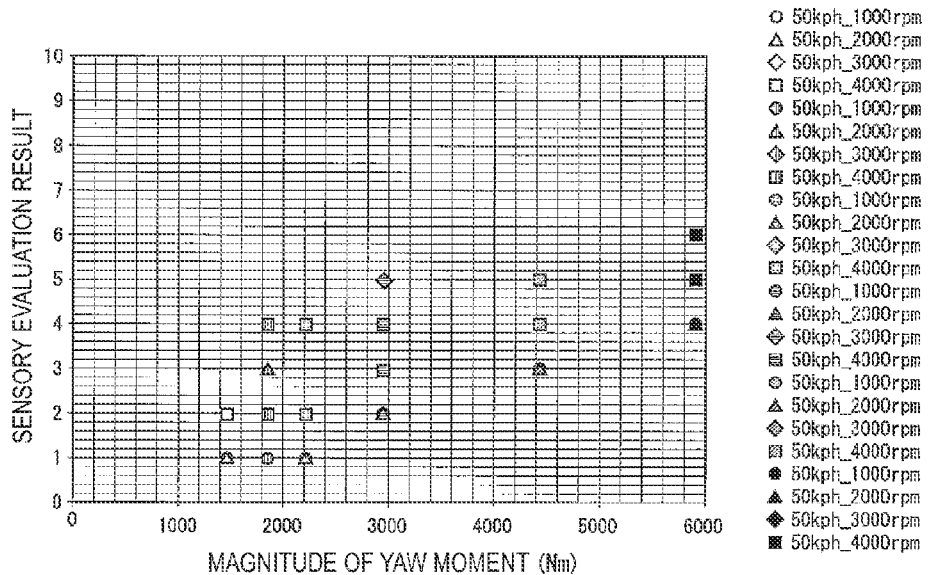
FIG. 11A is a diagram illustrating experimental results of a sensory evaluation in a case where a brake control by the ECU of the embodiment is not performed (at 50 Km/h).
Figure 11B:
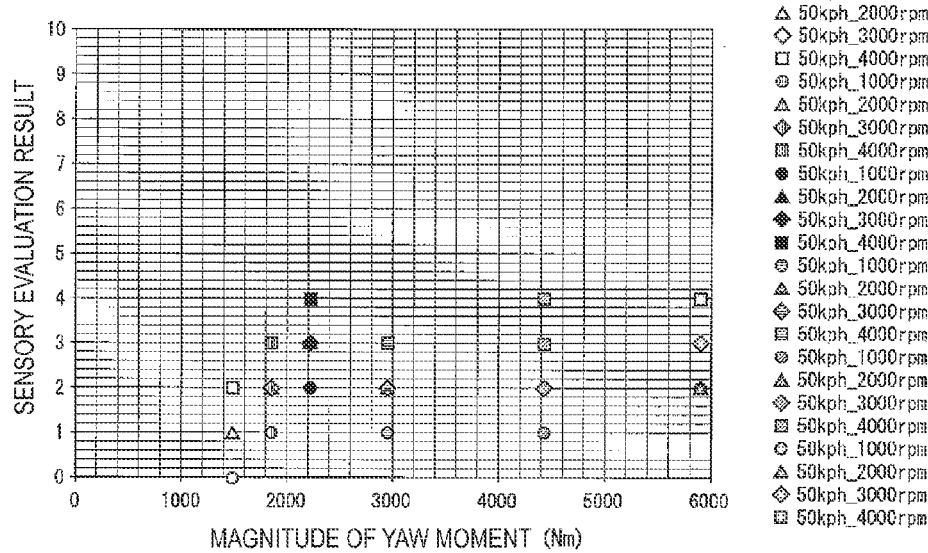
FIG. 11B is a diagram illustrating experimental results of a sensory evaluation in a case where the brake control by the ECU of the embodiment is performed (at 50 Km/h).

FIG. 11A is a diagram illustrating experimental results of a sensory evaluation in a case where the brake control by the ECU of the embodiment is not performed (at 50 Km/h). FIG. 11B is a diagram illustrating experimental results of a sensory evaluation in a case where the brake control by the ECU of the embodiment is performed (at 50 Km/h). In FIGS. 11A and 11B, horizontal axes indicate a magnitude of a yaw moment (Nm) and vertical axes indicate the sensory evaluation results. The ability to control a yaw direction is important in terms of vehicle dynamics. Thus, the intensity of the brake control can be expressed by the magnitude of the yaw moment (Mz). Accordingly, in the experimental results (of a vehicle test) illustrated in FIGS. 11A to 17F, it is considered that the intensity of braking is expressed by the magnitude of the yaw moment. A relationship between the "magnitude of the yaw moment" and the "intensity of the brake control", that is, conversion from the yaw moment to a brake pressure of each wheel, can be calculated by converting the yaw moment in a geometric manner. As a result, the brake pressure of the respective wheels (front and rear wheels on either right or left side, in the embodiment) can be calculated.

FIGS. 11A and 11B illustrate the sensory evaluation results under a condition where braking is applied to the front and rear wheels of four wheels, which are located on the same side, by the intensity corresponding to the yaw moment, in which the vehicle speed is set to 50 Km/h and a rotational frequency of the pump motor 15 is set to 1000 (rpm), 2000 (rpm), 3000 (rpm), or 4000 (rpm) for each case. The sensory evaluation results under a condition where the rotational frequency of the pump motor 15 is set to 1000 (rpm) are shown by circular marks, the sensory evaluation results under a condition where the rotational frequency of the pump motor 15 is set to 2000 (rpm) are shown by triangular marks, the sensory evaluation results under a condition where the rotational frequency of the pump motor 15 is set to 3000 (rpm) are shown by rhombus marks, and the sensory evaluation results under a condition where the rotational frequency of the pump motor 15 is set to 4000 (rpm) are shown by square marks. FIG. 11A illustrates the experimental results when the brake control by the ECU of the embodiment is not performed and FIG. 11B illustrates the experimental results when the brake control by the ECU of the embodiment is performed.

As illustrated in FIGS. 11A and 11B, the sensory evaluation results in a case where the brake control by the ECU of the embodiment is performed (see FIG. 11B) are, by and large, smaller than those in a case where the brake control by the ECU of the embodiment is not performed (see FIG. 11A). This means that, when the brake control by the ECU of the embodiment is performed, a degree of danger of the behavior of a vehicle is lowered and it is difficult for the driver of a vehicle to feel the danger.

Figure 12A:
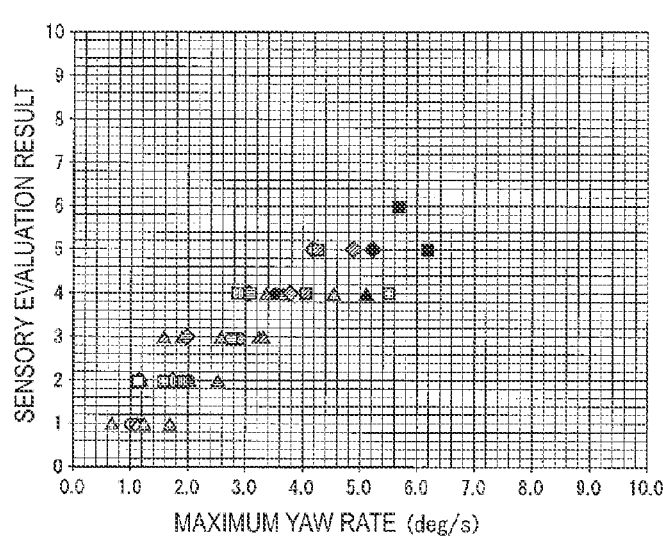
FIG. 12A is a diagram illustrating experimental results of the maximum yaw rate and a sensory evaluation, in a case where the brake control by the ECU of the embodiment is not performed (at 50 Km/h).
Figure 12B:
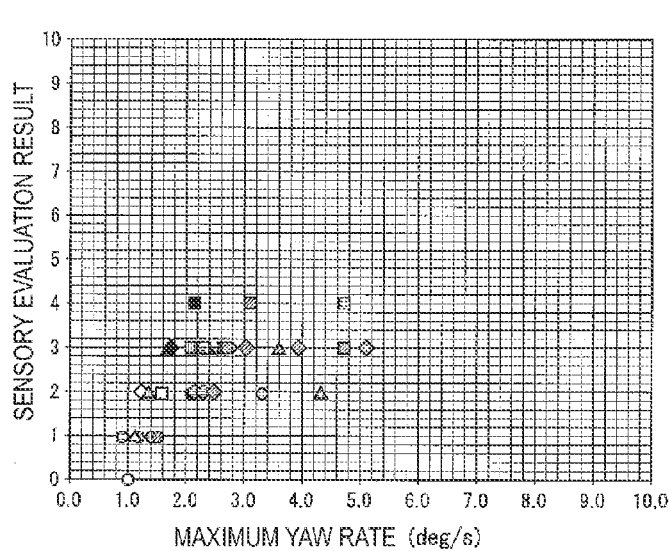
FIG. 12B is a diagram illustrating experimental results of the maximum yaw rate and a sensory evaluation, in a case where the brake control by the ECU of the embodiment is performed (at 50 Km/h).

FIG. 12A is a diagram illustrating experimental results of the maximum yaw rate and a sensory evaluation, in a case where the brake control by the ECU of the embodiment is not performed (at 50 Km/h). FIG. 12B is a diagram illustrating experimental results of the maximum yaw rate and a sensory evaluation when the brake control by the ECU of the embodiment is performed (at 50 Km/h). In FIGS. 12A and 12B, horizontal axes indicate the maximum yaw rate (deg/s) and vertical axes indicate the sensory evaluation results.

FIGS. 12A and 12B illustrate the maximum yaw rate (deg/s) of a vehicle and the sensory evaluation results under a condition where braking is applied to the front and rear wheels of four wheels, which are located on the same side, by the intensity corresponding to the yaw moment of 1473 (Nm), 1842 (Nm), 2210 (Nm), 2946 (Nm), 4419 (Nm), or 5892 (Nm), in which the vehicle speed is set to 50 Km/h and the rotational frequency of the pump motor 15 is set to 1000 (rpm), 2000 (rpm), 3000 (rpm), or 4000 (rpm) for each case.

As illustrated in FIGS. 12A and 12B, the maximum yaw rate (deg/s) of a vehicle in a case where the brake control by the ECU of the embodiment is performed (see FIG. 12B) are, by and large, smaller than those in a case where the brake control by the ECU of the embodiment is not performed (see FIG. 12A). Also, the sensory evaluation results in a case where the brake control by the ECU of the embodiment is performed (see FIG. 12B) are, by and large, smaller than those in a case where the brake control by the ECU of the embodiment is not performed (see FIG. 12A). This means that, when the brake control by the ECU of the embodiment is performed, the maximum yaw rate of a vehicle decreases. In addition, a degree of danger of the behavior of a vehicle is lowered and it is difficult for the driver of a vehicle to feel the danger.

Figure 13A:
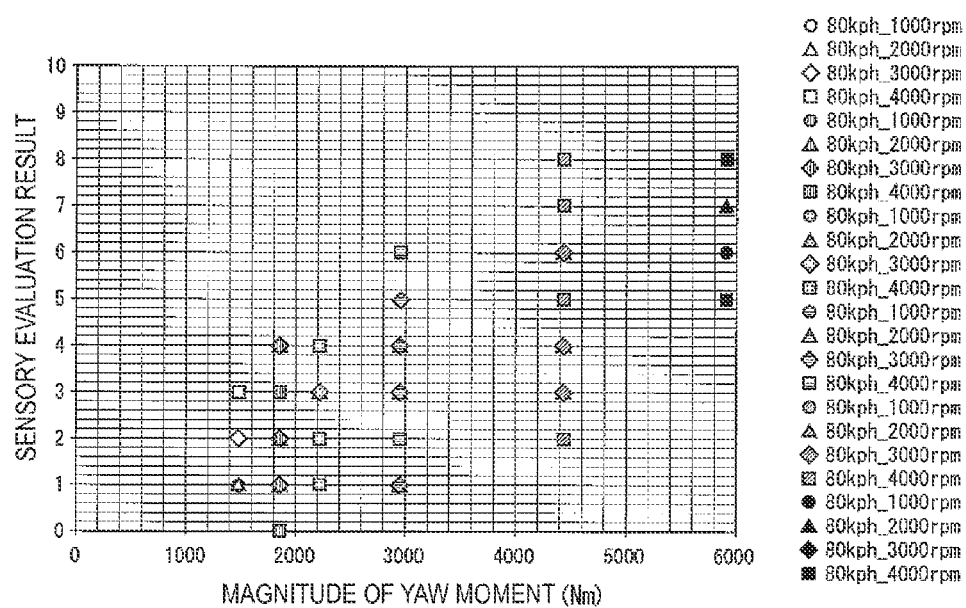
FIG. 13A is a diagram illustrating experimental results of a sensory evaluation in a case where the brake control by the ECU of the embodiment is not performed (at 80 Km/h).
Figure 13B:
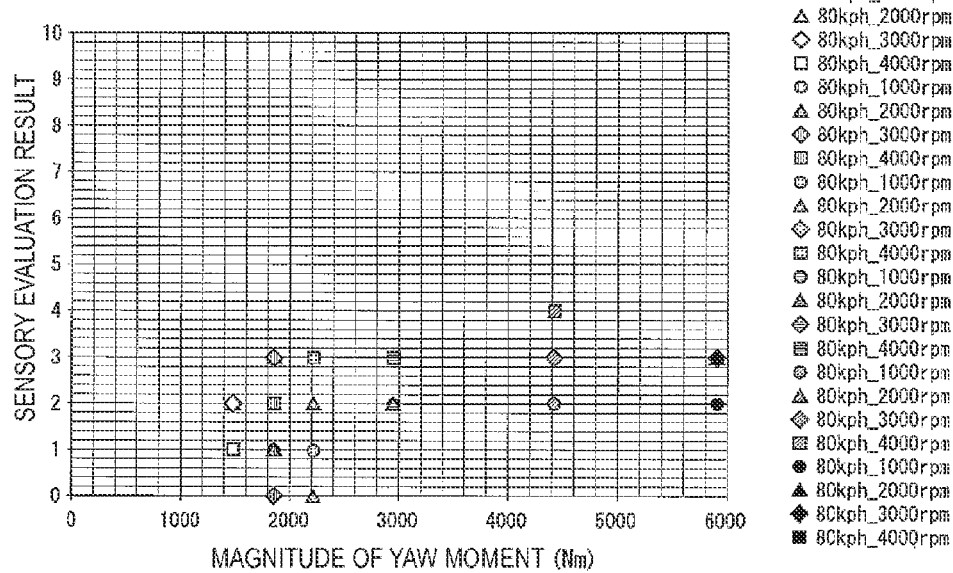
FIG. 13B is a diagram illustrating experimental results of a sensory evaluation in a case where the brake control by the ECU of the embodiment is performed (at 80 Km/h).

FIG. 13A is a diagram illustrating experimental results of a sensory evaluation in a case where the brake control by the ECU of the embodiment is not performed (at 80 Km/h). FIG. 13B is a diagram illustrating experimental results of a sensory evaluation when the brake control by the ECU of the embodiment is performed (at 80 Km/h).

The experimental results of the sensory evaluations illustrated in FIGS. 13A and 13B are obtained in experiments which are performed in the similar condition as in the experiments of the FIGS. 11A and 11B, except that the vehicle speed is set to 80 Km/h. Thus, detailed description will not be repeated. As similar to cases of FIGS. 11A and 11B, the sensory evaluation results in a case where the brake control by the ECU of the embodiment is performed (see FIG. 13B) are, by and large, smaller than those in a case where the brake control by the ECU of the embodiment is not performed (see FIG. 13A). This means that, when the brake control by the ECU of the embodiment is performed, a degree of danger of the behavior of a vehicle is lowered and it is difficult for the driver of a vehicle to feel the danger.

Figure 14A:
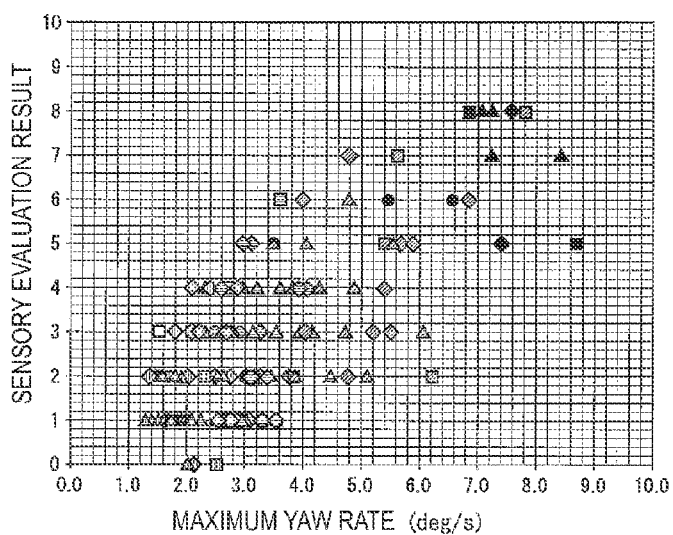
FIG. 14A is a diagram illustrating experimental results of the maximum yaw rate and a sensory evaluation, in a case where the brake control by the ECU of the embodiment is not performed (at 80 Km/h).
Figure 14B:
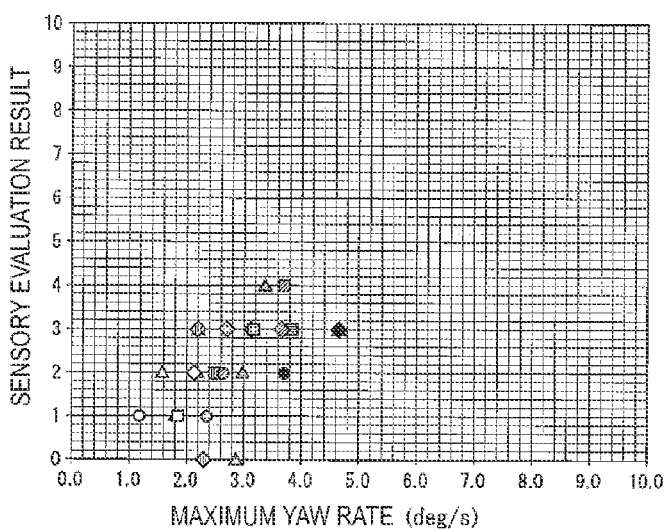
FIG. 14B is a diagram illustrating experimental results of the maximum yaw rate and a sensory evaluation, in a case where the brake control by the ECU of the embodiment is performed (at 80 Km/h).

FIG. 14A is a diagram illustrating experimental results of the maximum yaw rate and a sensory evaluation, in a case where the brake control by the ECU of the embodiment is not performed (at 80 Km/h). FIG. 14B is a diagram illustrating experimental results of the maximum yaw rate and a sensory evaluation, in a case where the brake control by the ECU of the embodiment is performed (at 80 Km/h).

The experimental results of the maximum yaw rate and the sensory evaluations illustrated in FIGS. 14A and 14B are obtained in experiments which are performed in the similar condition as in the experiments of the FIGS. 12A and 12B, except that the vehicle speed is set to 80 Km/h. Thus, detailed description will not be repeated. As similar to cases of FIGS. 12A and 12B, the maximum yaw rate and the sensory evalu-ation result in a case where the brake control by the ECU of the embodiment is performed (see FIG. 14B) are, by and large, smaller than the those in a case where the brake control by the ECU of the embodiment is not performed (see FIG. 14A). This means that, when the brake control by the ECU of the embodiment is performed, the maximum yaw rate of a vehicle decreases. In addition, a degree of danger of the behavior of a vehicle is lowered and it is difficult for the driver of a vehicle to feel the danger.

Figure 15A:
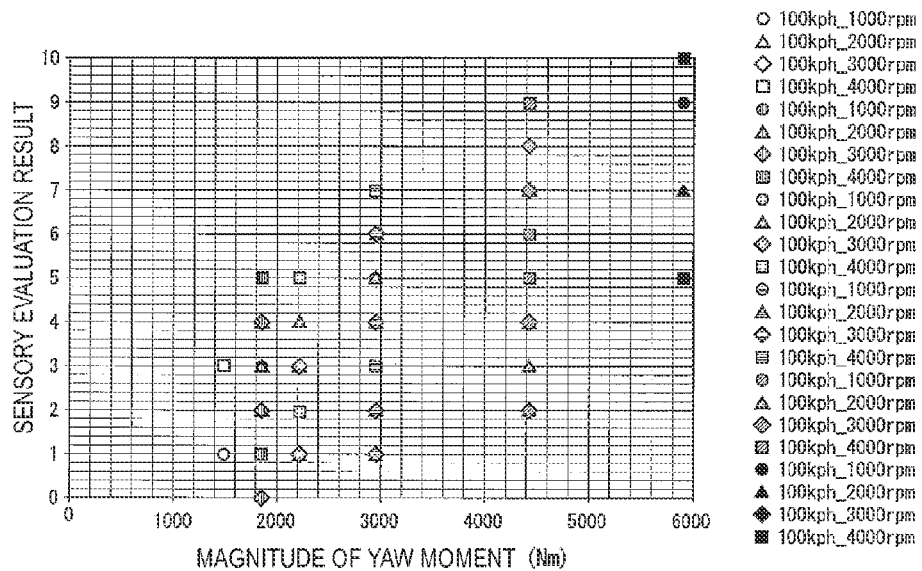
FIG. 15A is a diagram illustrating experimental results of a sensory evaluation in a case where the brake control by the ECU of the embodiment is not performed (at 100 Km/h).
Figure 15B:
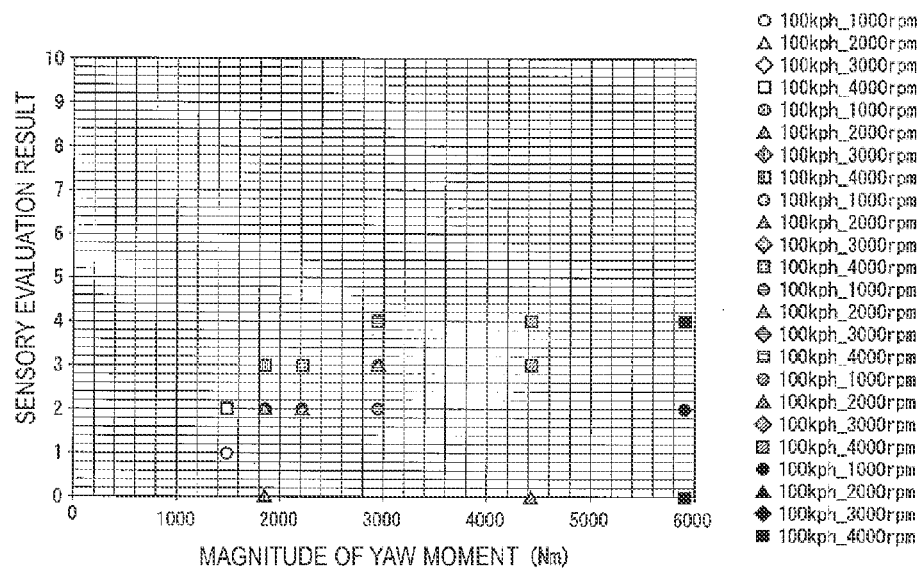
FIG. 15B is a diagram illustrating experimental results of a sensory evaluation in a case where the brake control by the ECU of the embodiment is performed (at 100 Km/h).

FIG. 15A is a diagram illustrating experimental results of a sensory evaluation in a case where the brake control by the ECU of the embodiment is not performed (at 100 Km/h). FIG. 15B is a diagram illustrating experimental results of a sensory evaluation in a case where the brake control by the ECU of the embodiment is performed (at 100 Km/h).

The experimental results of the sensory evaluations illustrated in FIGS. 15A and 15B are obtained in experiments which are performed in the similar condition as in the experiments of the FIGS. 11A and 11B, except that the vehicle speed is set to 100 Km/h. Thus, detailed description will not be repeated. As similar to cases of FIGS. 11A and 11B, the sensory evaluation results in a case where the brake control by the ECU of the embodiment is performed (see FIG. 15B) are, by and large, smaller than those in a case where the brake control by the ECU of the embodiment is not performed (see FIG. 15A). This means that, when the brake control by the ECU of the embodiment is performed, a degree of danger of the behavior of a vehicle is lowered and it is difficult for the driver of a vehicle to feel the danger.

Figure 16A:
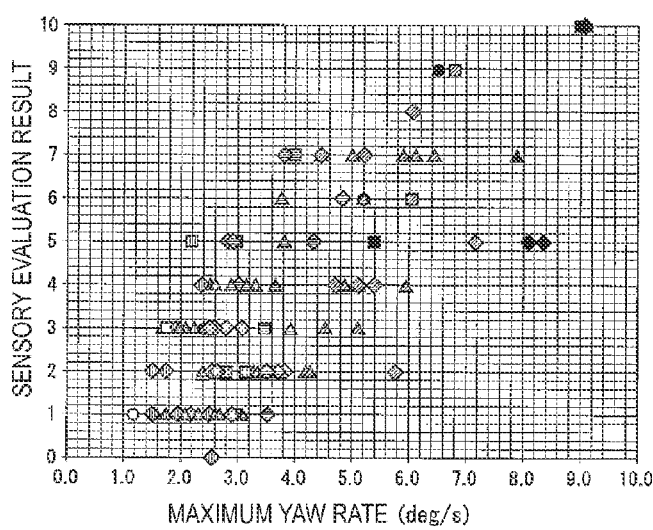
FIG. 16A is a diagram illustrating experimental results of the maximum yaw rate and a sensory evaluation, in a case where the brake control by the ECU of the embodiment is not performed (at 100 Km/h).
Figure 16B:
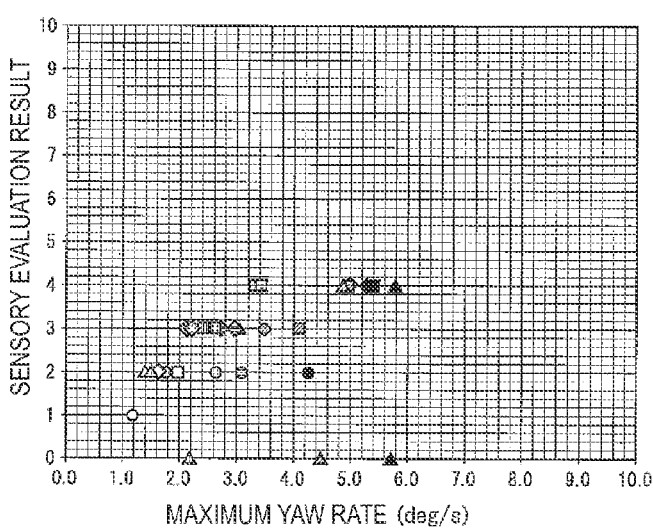
FIG. 16B is a diagram illustrating experimental results of the maximum yaw rate and a sensory evaluation, in a case where the brake control by the ECU of the embodiment is performed (at 100 Km/h).

FIG. 16A is a diagram illustrating experimental results of the maximum yaw rate and a sensory evaluation, in a case where the brake control by the ECU of the embodiment is not performed (at 100 Km/h). FIG. 16B is a diagram illustrating experimental results of the maximum yaw rate and a sensory evaluation, in a case where the brake control by the ECU of the embodiment is performed (at 100 Km/h).

The experimental results of the maximum yaw rate and the sensory evaluations illustrated in FIGS. 16A and 16B are obtained in experiments which are performed in the similar condition as in the experiments of the FIGS. 12A and 12B, except that the vehicle speed is set to 100 Km/h. Thus, detailed description will not be repeated. As similar to cases of FIGS. 12A and 12B, the maximum yaw rate and the sensory evaluation result in a case where the brake control by the ECU of the embodiment is performed (see FIG. 16B) are, by and large, smaller than the those in a case where the brake control by the ECU of the embodiment is not performed (see FIG. 16A). This means that, when the brake control by the ECU of the embodiment is performed, the maximum yaw rate of a vehicle decreases. In addition, a degree of danger of the behavior of a vehicle is lowered and it is difficult for the driver of a vehicle to feel the danger.

Figure 17A:
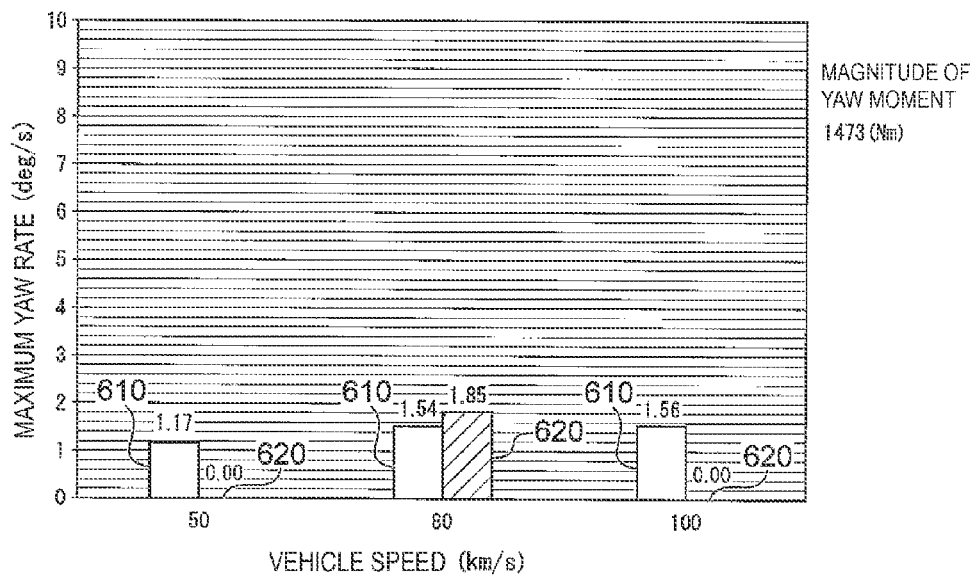
FIG. 17A is a diagram illustrating experimental results of the maximum yaw rate for each vehicle speed, in both cases where the brake control by the ECU of the embodiment is performed or not performed (magnitude of yaw moment: 1473 Nm).
Figure 17B:
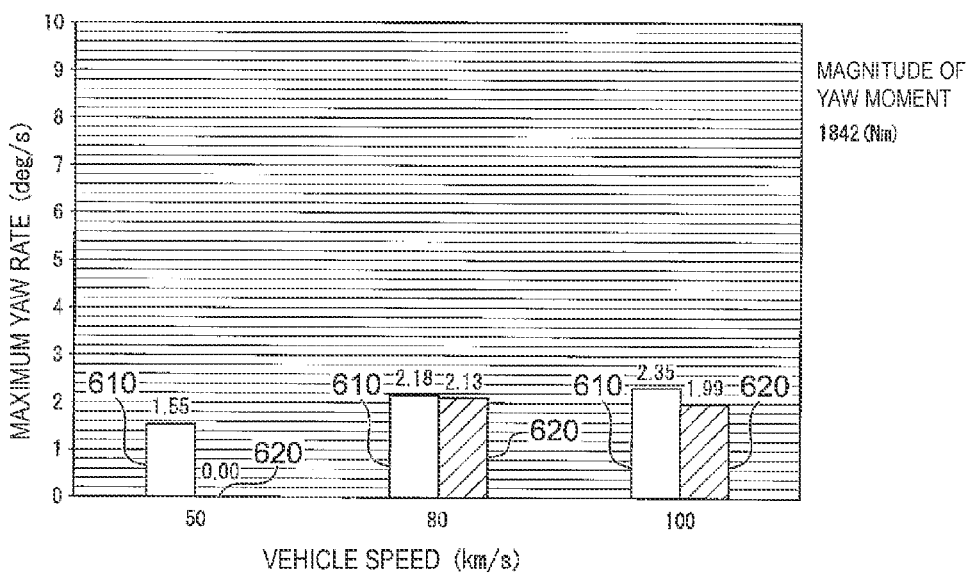
FIG. 17B is a diagram illustrating experimental results of the maximum yaw rate for each vehicle speed, in both cases where the brake control by the ECU of the embodiment is performed or not performed (magnitude of yaw moment: 1842 Nm).
Figure 17C:
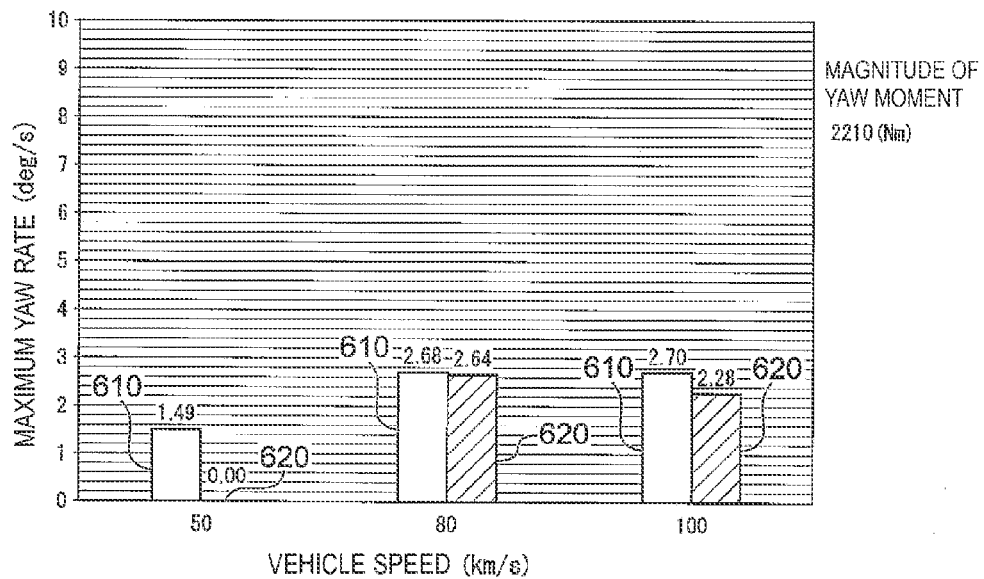
FIG. 17C is a diagram illustrating experimental results of the maximum yaw rate for each vehicle speed, in both cases where the brake control by the ECU of the embodiment is performed or not performed (magnitude of yaw moment: 2210 Nm).
Figure 17D:
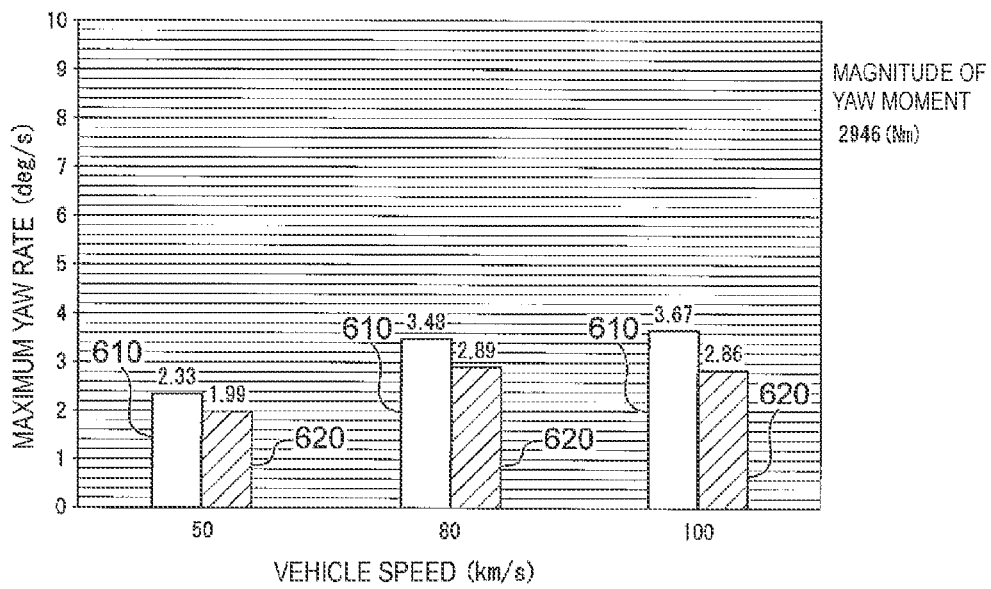
FIG. 17D is a diagram illustrating experimental results of the maximum yaw rate for each vehicle speed, in both cases where the brake control by the ECU of the embodiment is performed or not performed (magnitude of yaw moment: 2946 Nm).
Figure 17E:
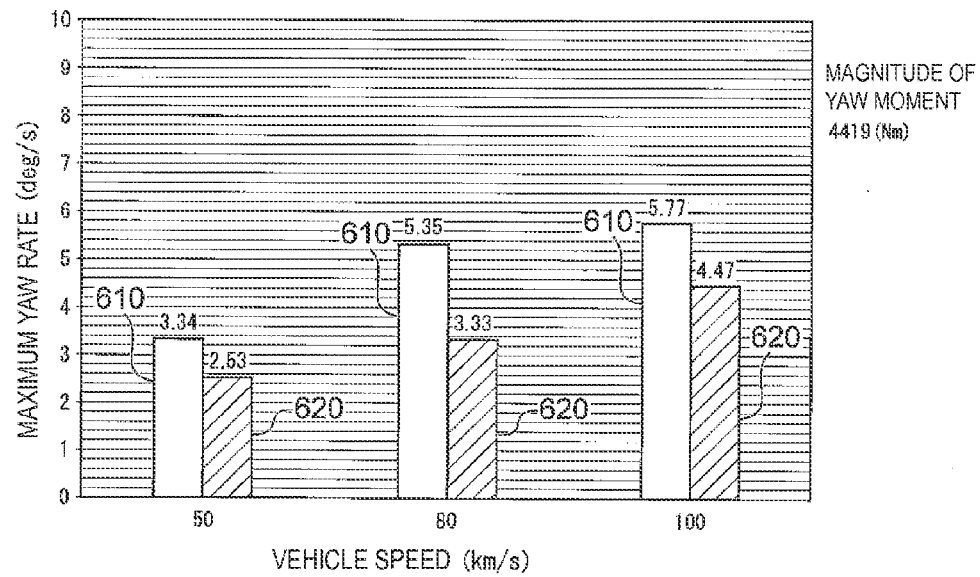
FIG. 17E is a diagram illustrating experimental results of the maximum yaw rate for each vehicle speed, in both cases where the brake control by the ECU of the embodiment is performed or not performed (magnitude of yaw moment: 4419 Nm).
Figure 17F:
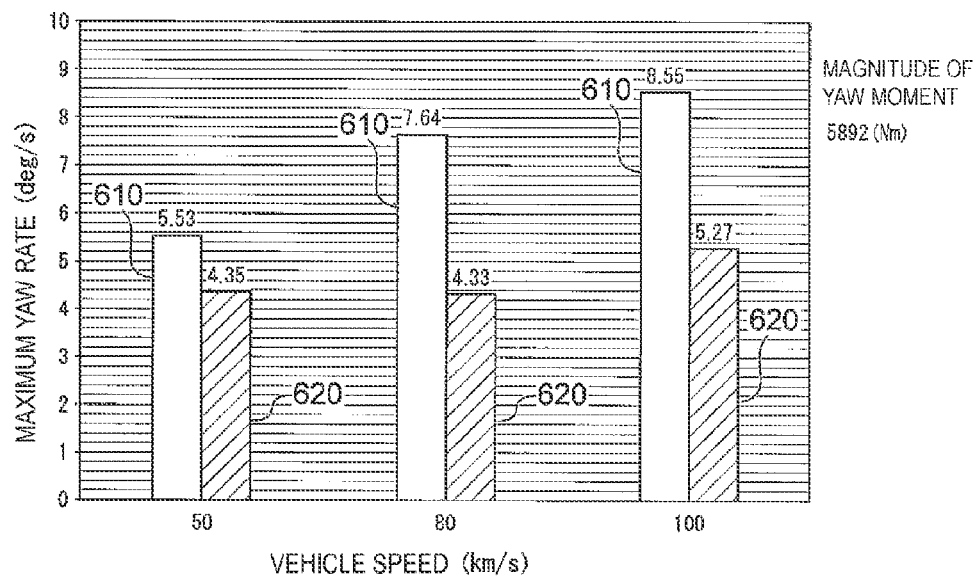
FIG. 17F is a diagram illustrating experimental results of the maximum yaw rate for each vehicle speed, in both cases where the brake control by the ECU of the embodiment is performed or not performed (magnitude of yaw moment: 5892 Nm).

FIG. 17A is a diagram illustrating experimental results of the maximum yaw rate for each vehicle speed, in both cases where the brake control by the ECU of the embodiment is performed or not performed (magnitude of yaw moment: 1473 Nm). In FIG. 17A, a horizontal axis indicates a vehicle speed (Km/h) and a vertical axis indicates the maximum vehicle yaw rate (deg/s).

FIG. 17A illustrates the maximum yaw rate for each vehicle speed, under a condition where braking is applied to the front and rear wheels of four wheels, which are located on the same side, by the intensity corresponding to the yaw moment of 1473 (Nm). In FIG. 17A, a graph 610 indicates the maximum vehicle yaw rate in a case where the brake control by the ECU of the embodiment is not performed and a graph 620 indicates the maximum vehicle yaw rate in a case where the brake control by the ECU of the embodiment is performed.

As illustrated in FIG. 17A, the maximum vehicle yaw rate in a case where the brake control by the ECU of the embodiment is performed (the graph 620) is, by and large, smaller than the maximum vehicle yaw rate in a case where the brake control by the ECU of the embodiment is not performed (the graph 610), except a case where the vehicle speed is set to 80 km/h. This means that, when the brake control by the ECU of the embodiment is performed, the maximum vehicle yaw rate is lowered.

FIGS. 17B to 17F are diagrams illustrating experimental results of the maximum yaw rates for each vehicle speed, in both cases where the brake control by the ECU of the embodiment is performed or not performed (magnitude of yaw moment: 1842 Nm, 2210 Nm, 2946 Nm, 4419 Nm, or 5892 Nm).

The experimental results of the maximum yaw rates illustrated in FIGS. 17B to 17F are obtained in experiments which are performed in the similar conditions as in the experiment of the FIG. 17A, except that the magnitude of the yaw moment is set to 1842 Nm, 2210 Nm, 2946 Nm, 4419 Nm, or 5892 Nm. Thus, detailed description will not be repeated. As similar to a case of FIG. 17A, the maximum yaw rate in a case where the brake control by the ECU of the embodiment is performed (the graph 620) is, by and large, smaller than the maximum yaw rate in a case where the brake control by the ECU of the embodiment is not performed (the graph 610). This means that, when the brake control by the ECU of the embodiment is performed, the maximum vehicle yaw rate is lowered.

According to the embodiment, in a case where the behavior of a vehicle becomes unstable due to the request signal which is output from the external ECU 300 to the hydraulic circuit 10, as it is, the controller 130 can deactivate the intervention of the request signal in the brake control. In other words, the deviation (the yaw rate deviation) between the yaw rate estimated by the yaw rate estimation portion 120 and the actual yaw rate measured by the yaw rate sensor 210 indicates degrees of instability of the behavior of a vehicle. Thus, when the yaw rate deviation is greater than the deviation threshold value, the controller 130 can deactivate the intervention of the request signal in the brake control. As a result, in the embodiment, the degrees of intervention of the brake control signal output from the external ECU in the brake control can be appropriately controlled.

Furthermore, according to the embodiment, in a case where the behavior of a vehicle becomes significantly unstable due to the request signal which is output from the external ECU 300 to the hydraulic circuit 10, as it is, the controller 130 can deactivate the intervention of the request signal in the brake control. That is, in a state where the yaw rate deviation exceeds the deviation threshold value, when the duration (the count value) in which the yaw rate deviation continuously exceeds the deviation threshold value exceeds a predetermined time threshold value, the controller 130 deactivates the brake control by the control signal. Therefore, in a state where the behavior of a vehicle is not unstable, even when the yaw rate deviation temporarily increases for some reason, regardless of the behavior of a vehicle, the controller 130 does not deactivate the intervention of the request signal in the brake control. Only when the count value exceeds the time threshold value and the behavior of a vehicle becomes significantly unstable, the controller 130 can deactivate the intervention of the request signal in the brake control. As a result, in the embodiment, the degrees of intervention of the brake control signal output from the external ECU in the brake control can be appropriately controlled.

In addition, according to the embodiment, the controller 130 sets the deviation threshold value to be smaller in accordance with an increase in the straight driving indicator calculated by the straight driving indicator determination portion 140. Thus, in a state where a vehicle travels in a substantially straight direction, when the behavior of a vehicle becomes unstable due to the brake control signal input from the external ECU 300, it is possible to promptly deactivate the brake control signal.

Furthermore, according to the embodiment, the controller 130 sets the time threshold value to be smaller in accordance with an increase in the straight driving indicator calculated by the straight driving indicator determination portion 140. Thus, in a state where a vehicle travels in a substantially straight direction, when the behavior of a vehicle becomes unstable due to the brake control signal input from the external ECU 300, it is possible to promptly deactivate the brake control signal.

What is claimed is:

1. A brake control unit for controlling braking of a vehicle, comprising:
    a receiving portion that receives a control signal related to braking of the vehicle which is transmitted from an external control unit installed outside the brake control unit;
    an estimation portion that estimates a yaw rate of the vehicle, based on a vehicle speed and steering angles which indicate turning angles of a steering wheel of the vehicle or turning angles of a wheel; and
    a controller which controls degrees of intervention of the control signal received by the receiving portion in a brake control, based on a deviation between the yaw rate estimated by the estimation portion and an actual yaw rate measured by a yaw rate sensor, wherein the controller is configured to determine whether or not to activate a brake control by the control signal received from the external control unit, based on the deviation.

2. The brake control unit according to claim 1,
    wherein the controller deactivates the brake control by the control signal when the deviation exceeds a predetermined deviation threshold value.

3. The brake control unit according to claim 2,
    wherein the controller sets the deviation threshold value to be smaller in accordance with an increase in the vehicle speed.

4. The brake control unit according to claim 2,
    wherein, in a state where the deviation exceeds the deviation threshold value, when duration in which the deviation continuously exceeds the deviation threshold value exceeds a predetermined time threshold value, the controller deactivates the brake control by the control signal.

5. The brake control unit according to claim 2, further comprising:
    a straight driving indicator determination portion that calculates a straight driving indicator of the vehicle, based on the steering angles of the vehicle and a steering angular speed which indicates a turning speed of the steering wheel of the vehicle or a turning speed of the wheel,
    wherein the controller sets the deviation threshold value or the time threshold value to be smaller in accordance with an increase in the straight driving indicator which is calculated by the straight driving indicator determination portion.

* * * * *